United States Patent [19]

Dae et al.

[11] Patent Number: 5,109,067

[45] Date of Patent: Apr. 28, 1992

[54] PROCESS FOR THE PREPARATION OF THE MODIFIED RESIN AND EPOXY RESIN COMPOSITION CONTAINING THE MODIFIED RESIN FOR USE IN SEMICONDUCTOR ENCAPSULATION

[75] Inventors: Lee J. Dae; Yoo C. Joon, both of Soowon; Kim B. Sung, Seoul, all of Rep. of Korea

[73] Assignee: Korea Chemical Co., Ltd., KvungSangNam-Do, Rep. of Korea

[21] Appl. No.: 394,156

[22] Filed: Aug. 14, 1989

Related U.S. Application Data

[63] Continuation of Ser. No. 79,455, Jul. 30, 1987, abandoned.

[30] Foreign Application Priority Data

May 30, 1987 [KR] Rep. of Korea ............... 87-5449

[51] Int. Cl.$^5$ .............................................. C08L 83/06
[52] U.S. Cl. ........................................ 525/101; 525/105; 525/119; 525/122; 525/476
[58] Field of Search ............... 525/101, 105, 119, 122, 525/476

[56] References Cited

U.S. PATENT DOCUMENTS

| | | | |
|---|---|---|---|
| 3,179,143 | 4/1965 | Schultz et al. | 525/122 |
| 3,926,904 | 12/1975 | Scola | 525/119 |
| 3,959,533 | 5/1976 | Kitaj | 525/101 |
| 4,234,702 | 11/1980 | Nakamura | 525/101 |
| 4,275,190 | 6/1981 | Dudgeon | 525/122 |
| 4,657,986 | 4/1987 | Isayama et al. | 525/105 |

FOREIGN PATENT DOCUMENTS

| | | |
|---|---|---|
| 0004657 | 1/1984 | Japan . |
| 0113021 | 6/1984 | Japan . |
| 0083628 | 12/1986 | Japan . |
| 0281120 | 12/1986 | Japan . |

*Primary Examiner*—Melvyn I. Marquis
*Assistant Examiner*—R. Dean
*Attorney, Agent, or Firm*—Birch, Stewart, Kolasch & Birch

[57] ABSTRACT

A process for preparing a modified resin and an epoxy resin composition for use in semiconductor encapsulation which comprises providing a quantity of epoxy resins, synthetic rubber compounds, and hydroxy modified polysiloxanes, reacting the epoxy resins with the synthetic rubber compounds, and reacting the resultant product of the initial reaction with the hydroxy modified polysiloxanes, the epoxy resin composition comprising 0.1–10% by weight of the modified resin, epoxy resin, curing agent, catalyst, releasing agent, coupling agent, and fibers.

10 Claims, 1 Drawing Sheet

PARTICLE SIZE:
ABOVE 50 μm (x1500)

PARTICLE SIZE:
ABOVE 10-20 μm
(x1500)

PARTICLE SIZE:
ABOVE 1-5 μm
(x1500)

PROCESS FOR THE PREPARATION OF THE MODIFIED RESIN AND EPOXY RESIN COMPOSITION CONTAINING THE MODIFIED RESIN FOR USE IN SEMICONDUCTOR ENCAPSULATION

This application is a continuation of application Ser. No. 07/079,455 filed on Jul. 30, 1987, now abandoned.

BACKGROUND OF THE INVENTION

1. Field of the Invention

The present invention relates to a process for preparing a modified resin for use in semiconductor encapsulation and its epoxy resin composition containing the modified resin for use in semiconductor encapsulation.

The modified resin and its epoxy composition exhibit heat resistance, wet proof properties, low stress, and higher reliability when used in semiconductor encapsulation.

2. Description of the Prior Art

In various thermosetting resins, the epoxy resin is widely used as a material necessary for the encapsulation of semiconductor devices such as IC, LSI, VLSI, transistors, and diode since it exhibits excellent properties such as electrical insulation and great resistance against chemical and thermal shock.

As electronic parts become smaller and lighter, the requirement of larger capacity and a more integrated semiconductor has recently increased in the electronic industry and has resulted in a need for new resin compositions having higher resistance against all kinds of impacts.

Generally, low stress is required of a resin composition for use in encapsulating semiconductors since the thermosetting layer of such semiconductor devices is cracked or semiconductor elements or wire bondings are impaired owing to the remaining stress caused by changes in volume, temperature during long periods of use in electronic components, and inner stress produced by a difference of the coefficient of linear thermal expansion between the metal components and the encapsulating resin materials.

Accordingly, to obtain the lower stress requirements of encapsulating material, the coefficient of elasticity of the resin components is required to be as low as possible as well as difference in coefficient of linear thermal expansion between the resin materials and the metal components. The resin components are required to be smaller and to absorb outer impact energy.

In order to obtain lower stress properties, there are many types of known methods, such as addition of an inorganic filler, plasticizers, or various silicone resins; or adjusting the distribution of the silica particle size.

However, when larger amounts of inorganic filler are added, the rate of failures increases and fluidity decreases. When larger amounts of plasticizer are added, glass transition temperature tends to go down. When synthetic rubber is simply mixed, there are many problems in the molding process since bleeding occurs during molding treatment. When silicone resin or oil is mixed, problems such as lower wet proof reliability due to bad adhesion with metal components and bleeding out during molding treatment occur.

SUMMARY OF THE INVENTION

The present invention relates to a method of preparing a modified resin from an epoxy resin having functional epoxy groups within the molecule or at its terminal end, synthetic rubber compounds containing functional groups at both ends of the molecule, and hydroxy modified polysiloxanes such as alcohol modified polysiloxanes having reactive hydroxy groups in a modified resin wherein the modified resin contains at least about 10 to 50% by weight of the insoluble and infusible globular particles based on the total weight.

Also, the present invention relates to an epoxy resin composition which comprises modified resin of about 0.1 to 10.0% by weight in a conventional epoxy resin composition and the composition used in encapsulating a semiconductor. The composition of the present invention possesses higher heat resistance, anticracking, and wet proof properties over prior epoxy resin compositions for use in encapsulating a semiconductor such as an IC, LSI, VLSI, and the like.

DESCRIPTION OF THE PREFERRED EMBODIMENT

Figure 1A:
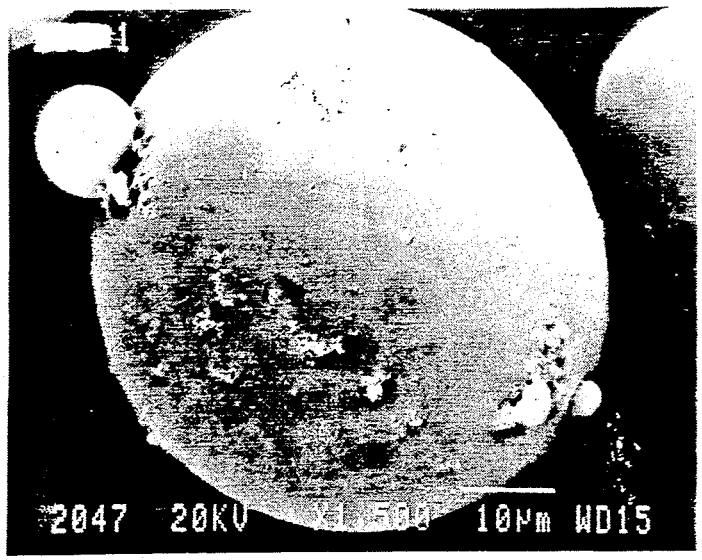
FIGS. 1-A, 1-B and 1-C are enlarged perspective views of globular particle manufactured by the method of the present invention.

The modified resin of the present invention is produced from epoxy resins, sythetic rubber compounds, and hydroxy modified polysiloxanes. The process according to the present invention comprises the steps of first reacting the epoxy resins with the synthetic rubber compounds; and second reacting the resultant products prepared from the first reaction with the hydroxy modified polysiloxanes.

The epoxy resins used as raw materials contain at least two epoxy groups within the molecule or at its terminal end, preferably the epoxy resins are bisphenol-A, phenolnovolac, cresolnovolac epoxy resin, or mixtures thereof.

Such bisphenol-A epoxy resins in liquid form of which the equivalent value is 180 to 200, in solid form of which the equivalent value is 400 to 500, and wherein the softening point thereof is about 70° to 90° C. are preferable.

Such phenolnovolac epoxy resins in liquid form of which the equivalent value is 170 to 190 and phenolnovolac epoxy or cresolnovolac epoxy resins in solid form of which the equivalent value is 180 to 220, respectively, and the softening point thereof is 60° to 85° C. in both cases are acceptable.

The synthetic rubber compounds used in first reaction step may be ordinary rubbers, particularly, butadiene rubber, isoprene rubber, acrylonitrile rubber, hydrogenated butadiene rubber, or its copolymers thereof. Such compounds possess hydroxy groups, carboxy groups, or amino groups at both ends of the molecule respectively, about 1,000-5,000 in molecular weight is more preferable.

Examples of the synthetic rubber compounds are alkenyl polymers containing isocyanate groups such as poly-bd45 HT made by Japans Idemitsu Co.; polybutadienes having hydroxyl or carboxyl groups on both ends such as C-1000, C-2000, CI-1000, G-1000, G-2000, G-3000 made by Japans Nippon Soda Co.; and carboxyl, amine, or hydroxyl terminated polymers including acrylonitrile and butadiene groups such as and ATBN, CTBN, CTB, CTIN, HTBN, made by Goodrich Co.

The hydroxy modified polysiloxanes used in the second reaction have $C_{1-3}$ alkoxy groups and $C_{1-6}$ alkyl groups in the molecule and a molecular weight of about 300 to 6,000 is preferable, particularly, in oil-types, resin-types and intermediate-types.

Polysiloxane compounds used in the second reaction of the present invention are, for example, hydroxy containing silicone resins such as SF-8427, SF-8428, BX-16-001, BX-16-002, BX16-003, BX16-004, BX16-005, BX16-006, BX16-007, BX16-008, BX16-009, BX16-010, BX16-011, BX16-012, BY16-848, BX16-848B, BY11-954, BY11-953, SH-3771, SH-3746, SH-6018, made by Toray Silicone Co., Ltd.; hydroxy terminated silicone-containing synthetic polymers such as and X-22-160 AS, X-22-160A, X-22-160B, X-22-160C made by Shi-netsu Co.

The process for preparing the modified resin of the present invention comprises of the steps of first reacting about 30 to 80% by weight of an epoxy resin or resin mixtures based on the total weight, with about 10 to 30% by weight of the synthetic rubber compounds or rubber compound mixtures, based on the total weight, having functional groups at both ends in a heating reactor equipped with an agitator at about 100° to 200° C. for about 1 to 10 hours.

Depending on the raw materials, catalysts such as titanium or phosphines may be added for easily promoting the reaction.

In the first reaction, the synthetic rubber compounds having the functional groups at both ends of the molecule such as a hydroxy group (—OH), carboxy group (—COOH), and amino group (—NH$_2$) are reacted with the epoxy groups in the epoxy resin to make a copolymer of the epoxy resins and the rubber compounds, or a multiple overlapped copolymer of the epoxy resin and the rubber compounds.

The reaction can be controlled by the detection and control of the epoxy equivalent value, acid value, amine value, and hydroxy equivalent value; and also by the analysis of the characteristic peak changes of the functional groups such as amine group, hydroxy group, and carboxy group in the synthetic rubber compounds with FT-IR or FT-NMR.

After the first reaction is completely finished, the second reaction finally proceeds to provide the modified resin. About 10 to 60% by weight of the hydroxy modified polysiloxanes based on the total weight are further added into the first reaction mixtures and then the reaction is continued for about 2 to 6 hours at about 80° C. to 180° C. in the same reaction vessel.

The modified resins obtained from the second reaction contain about 10 to 50% by weight of insoluble and infusible globular particles based on the total weight.

Figure 1B:
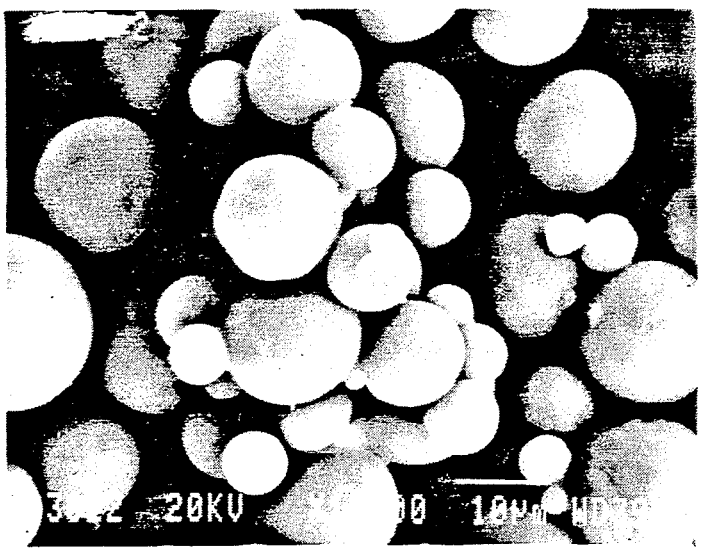
Figure 1C:
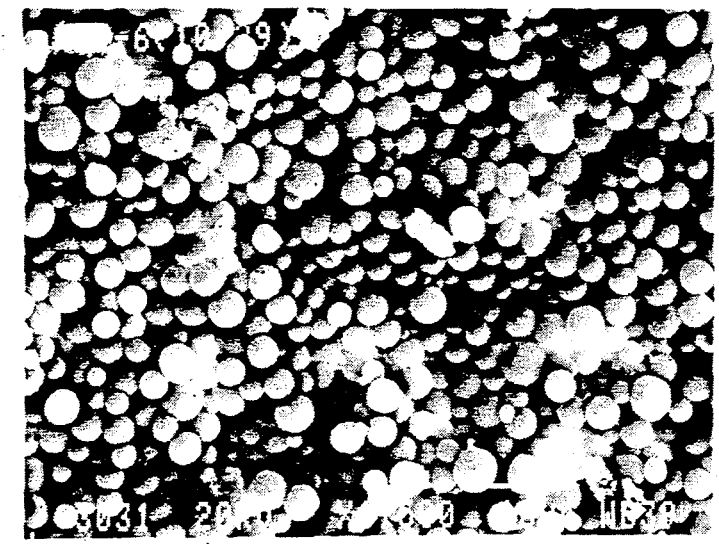

The SEM (Scanning Electro Microscope) pictures obtained by the present invention are shown in FIGS. 1-A, 1-B and 1-C.

The products from the second reaction may contain a small portion of unreacted epoxy resin and hydroxy modified polysiloxanes as by-products.

The insoluble and infusible globular particles formed in the final second reaction of the present invention may be comprised mostly of reaction products from the epoxy resins, the synthetic rubber compounds, and the hydroxy modified polysiloxanes and/or a small amount of the hydroxy modified polysiloxanes. The particle size is from 0.1 to 100 μm and 10 to 50% by weight on the total weight.

The process of the present invention presents such globular particles when phase separation takes place during the reaction by properly using the difference of solubility, namely solubility parameter among the epoxy resin, synthetic rubber, and modified polysiloxanes.

Globular particles obtained by the present invention have a structure of the epoxy resin, the synthetic rubber compounds, and the hydroxy modified polysiloxanes combined in complex.

Since such particles are globular in shape can be absorbed, the impact from both of the outer, dispersed and reduced to a great extent, and the lowering of the glass transition temperature is also prevented, the particles have the low stress when used in the semiconductor encapsulating by the epoxy resin compositions.

As the modified resin of the present invention possess the good resistance against the chemical corrosion and the stability of heat resistance induced from the silicone compounds; and the low modulus induced from the rubber compounds, highly reliable semiconductor devices can be prepared by adding the modified resin of the present invention as a composite of the resin composition for use in encapsulating the semiconductors.

Furthermore, when the modified resin produced by the present invention is added into the epoxy resin composition as one of the composites for encapsulating the semiconductor, the elution problem of the rubbers and the silicone compounds as pointed out in the prior art can be solved found. That is, the elution problem of the rubbers and the silicones which bleed out during the molding process, namely, the bleed and flush problem, can be completely solved.

A highly reliable semiconductor can be manufactured by adding the modified resin of the present invention to the conventional epoxy resin composition. Since it does not ooze out from the surface under the favorable condition for a long time and it exhibits a lower difference between the coefficient of linear thermal expansion of the metal buried in the semiconductor device and the coefficient of linear thermal expansion of epoxy resin composition in molding, this results in the globular particles absorbing the impact energy from both of the outer and the inner surroundings and so as to disperse it.

Furthermore, the compositions of the present invention prevent the formation of cracks and exhibit improvements in heat resistance. Therefore, the semiconductor devices made of the compositions are highly reliable.

The modified resin manufactured by the present invention process can be used as one composite of final encapsulation compositions for the semiconductor by blending the modified resin in a conventional epoxy resin composition so as to amount to about 0.1–10% by weight of the total weight.

For the epoxy resin composition of the present invention, phenolnovolac epoxy resins and crezolnovolac epoxy resins are preferable. About 10 to 25% by weight of these epoxy resins in the total weight, with a softening point of about 60° to 120° C., and an equivalent value 180 to 280 are preferred.

Curing agents such as amines, acid anhydride, and phenol resin can be added. The amines are difficult to keep it in storage and toxic but it promotes the curing reaction at lower temperature. The acid anhidride can be used but it has disadvantages since it requires high temperature and long reaction time. The phenol resin type curing agents are prepared by reacting one of the phenol, cresol, chlorophenol, phenylphenol, bisphenol-A, or a mixture thereof with formaldehyde or paraformaldehyde in an acid catalyst containing more than two phenolic hydroxy groups in one molecule. In the present invention, it is more advantageous to use a phenol resin which has a lower amount of unreacted monomers and an amount of about 5 to 15% by weight of the total weight of the curing agents are preferred.

Accelerators, for example, substituted imidazols such as 2-methylimidazol, 2-phenylimidazole, 2-pentadecylimidazol, 2-ethyl-4-methylimidazol, substituted phosphines such as triphenyl phosphine, and tertiary amines such as 2-(dimethylaminomethyl) phenol, 2, 4, 6-tris (dimethylaminophenyl) phenol, benzyl dimethyl amines may be added into the composition and its addition amounts in an amount of about 0.1 to 1.0% by weight in the total weight.

Inorganic fillers, for example, fused silica, crystalline silica, aluminum oxide, aluminum hydroxide, magnesium oxide, potassium carbonate, barium sulphate, and talc can be added within the range of about 50 to 80% by weight in the total composition weight. The linear thermal expansion coefficient of the encapsulating material is increased and the failure rate accordingly, rise in case that less than 50% by weight of the inorganic fillers is added, but the fluidity of the composition is remarkably declined and treatment becomes difficult if more than 80% by weight of the inorganic fillers is added. About 0.1 to 10.0% by weight of modified resins in accordance with the present invention is blended into the composition. It is not enough to produce the molding forms lower stress if the modified resins are added in an amount of less than about 0.1% by weight and it may present a bad effect on mechanical property and heat-resistance if much more than about 10.0% by weight of the modified resins are added.

Inorganic surface treating agents, internal releasing agents, coupling agents or pigments may be mixed into the composition according to the present invention.

Regarding the molding methods of semiconductors utilizing the composition defined by the present invention, compression molding or transfer molding process is utilized.

In the case of transfer molding, processing conditions may vary according to the size, shape, and requirements of an article to be molded. Casting or molding form is generally made at curing temperature from about 150° to 180° C. and molding pressure from about 50 to 150 Kg/cm$^2$ for 60 to 200 seconds at first and then further post-heat curing has done at about 160°-200° C. for about 4 to 15 hours.

The present invention will now be described in more detail in connection with the following examples which should be considered as being examplary and not limiting the present invention.

PROCESS EXAMPLE 1 TO 9

Modified resin in accordance with the present invention is prepared according to the following Table (I):

TABLE (I)

| | | | \multicolumn{8}{c}{Number of modified resin} |
| | | | 1 | 2 | 3 | 4 | 5 | 6 | 7 | 8 |
|---|---|---|---|---|---|---|---|---|---|---|
| Blending Rate of Raw Material | Epoxy resin | Phenol novolac (i) | 50 | 50 | 50 | | | | 25 | 25 |
| | | Bisphenol-A (ii) | | | | 50 | 50 | 50 | 25 | 25 |
| | Synthetic rubber compounds | CTBN (iii) | 20 | | 10 | 20 | | 10 | 20 | |
| | | C-1000 (iv) | | 20 | 10 | | 20 | 10 | | 20 |
| | Silicon compounds | SH-6018 (v) | 30 | 30 | 30 | 30 | 30 | 30 | 30 | 30 |
| First Reaction | Reaction temperature (°C.) | | 170 | 170 | 170 | 100 | 100 | 100 | 110 | 110 |
| | Acid Value | | \multicolumn{8}{c}{Less than 0.1} |
| | Viscosity (Poise Cone & plate 150° C.) | | 7.5 | 9.0 | 8.5 | 3.5 | 4.5 | 4.0 | 6.0 | 7.0 |
| | Reaction time | | 6-8 | 6-8 | 6-8 | 3-4 | 3-4 | 3-4 | 5-6 | 5-6 |
| | Catalyst | | — | Triphenyl phosphine (TPP) | Tetrabutyl titan monomer (TBTM) | — | TPP | TBTM | — | TPP |
| Second Reaction | Reaction Temperature (°C.) | | 120 | 120 | 120 | 90 | 90 | 90 | 100 | 100 |
| | Size of the globular Particle (μm) | | 1-10 | 1-10 | 1-10 | 50-70 | 50-70 | 50-70 | 30-50 | 30-50 |
| | Yield of the globular Particle | | 12.5 | 43.2 | 32.3 | 11.9 | 42.8 | 33.1 | 13.0 | 42.4 |

Remarks:
(i) Phenolnovolac-type epoxy resins in solid form (Epoxy equivalent value: 180-195)
(ii) bisphenol-type epoxy resins in solid form (Epoxy equivalent value: 440-575)
(iii) CTBN 1300X13 (Brookfield viscosity at 27° C.; 570,000, Contents of acrylonitrile 26%, Goodrich Co.) is a tradename representing a butadiene/acrylonitrile copolymer containing about 26 wt % of acrylonitrile based on the copolymer, the general chemical formula of which is

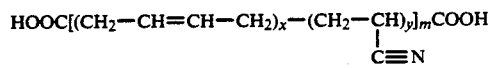

(iv) C-1000 (Nippon Sodatsu) is a tradename representing α, ω-polybutadiene having a molecular weight of 1,300 and a density of 0.89, the molecular formula of C-1000 being

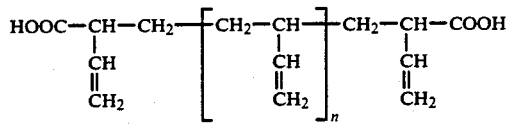

wherein n is an integer
(v) SH-6018 (Shinetsu Co. Hydroxy equivalent 400)

the comparison Example No. 1-2 and test results are on the Table (III).

TABLE (III)

| | Example No. | | | | | | | |
|---|---|---|---|---|---|---|---|---|
| | 1 | 2 | 3 | 4 | 5 | 6 | 7 | 8 |
| Transition point (C.) | 159 | 161 | 160 | 155 | 158 | 156 | 157 | 159 |
| Elasticity of traction (Kg/mm$^2$) | 1020 | 1060 | 1040 | 950 | 1010 | 970 | 980 | 1000 |
| Coefficient of linear thermal expansion (i) | 19.8 | 19.3 | 19.5 | 19.7 | 19.6 | 19.4 | 19.7 | 19.9 |
| Heat Resistance (Frequency of Cracking) (ii) | 0/100 | 0/100 | 0/100 | 1/100 | 1/100 | 1/100 | 0/100 | 0/100 |
| P. C. T. (iii) | 0/100 | 0/100 | 0/100 | 1/100 | 2/100 | 1/100 | 0/100 | 0/100 |

| | Example No. | | | | | Comparative Ex. No. | |
|---|---|---|---|---|---|---|---|
| | 9 | 10 | 11 | 12 | 13 | 1 | 2 |
| Transition point (C.) | 158 | 161 | 154 | 156 | 156 | 163 | 164 |
| Elasticity of traction (Kg/mm$^2$) | 990 | 1060 | 950 | 980 | 990 | 1370 | 1420 |
| Coefficient of linear thermal expansion (i) | 19.8 | 19.2 | 19.6 | 19.5 | 19.7 | 24.1 | 23.6 |
| Heat Resistance (Frequency of Cracking) (ii) | 1/100 | 1/100 | 0/100 | 0/100 | 0/100 | 6/100 | 7/100 |
| P. C. T. (iii) | 1/100 | 0/100 | 1/100 | 0/100 | 1/100 | 4/100 | 5/100 |

EXAMPLES 1 to 13 AND COMPARATIVE EXAMPLES 1 to 2

Epoxy resin compositions for encapsulating the semiconductors is mixed as the following Table (II) in which the modified resin is prepared in accordance with the process Examples 1 to 9.

TABLE (II)

| | | Example No. | | | | | | | | | | | | | Comparative Ex. No. | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 |
| Novolac Epoxy resin (i) | | 100 | 100 | 100 | 100 | 100 | 100 | 100 | 100 | 100 | 100 | 100 | 100 | 100 | 100 | 100 |
| Phenol resin Curing Agent (ii) | | 50 | 50 | 50 | 50 | 50 | 50 | 50 | 50 | 50 | 50 | 50 | 50 | 50 | 50 | 50 |
| Imidazol Catalysts (iii) | | 12 | 12 | 12 | 12 | 12 | 12 | 12 | 12 | 12 | 12 | 12 | 12 | 12 | 12 | 12 |
| Carbon Black (iv) | | 4 | 4 | 4 | 4 | 4 | 4 | 4 | 4 | 4 | 4 | 4 | 4 | 4 | 4 | 4 |
| Surface Treatment Agent | | 3 | 3 | 3 | 3 | 3 | 3 | 3 | 3 | 3 | 3 | 3 | 3 | 3 | 3 | 3 |
| Silica Powder | | 450 | 450 | 450 | 450 | 450 | 450 | 450 | 450 | 450 | 450 | 450 | 450 | 450 | 450 | 450 |
| Zinc Stearate | | 3 | 3 | 3 | 3 | 3 | 3 | 3 | 3 | 3 | 3 | 3 | 3 | 3 | 3 | 3 |
| | No. | | | | | | | | | | | | | | | |
| Modified | 1 | 5 | — | — | — | — | — | — | — | — | — | — | — | — | — | — |
| Resin in | 2 | — | 5 | — | — | — | — | — | — | — | 10 | — | — | — | — | — |
| accordance | 3 | — | — | 5 | — | — | — | — | — | — | — | — | — | — | — | — |
| with the | 4 | — | — | — | 5 | — | — | — | — | — | — | 20 | — | — | — | — |
| Manufact. | 5 | — | — | — | — | 5 | — | — | — | — | — | — | — | — | — | — |
| Examples | 6 | — | — | — | — | — | 5 | — | — | — | — | — | — | — | — | — |
| 1 to 9 | 7 | — | — | — | — | — | — | 5 | — | — | — | — | 40 | — | — | — |
| | 8 | — | — | — | — | — | — | — | 5 | — | — | — | — | — | — | — |
| | 9 | — | — | — | — | — | — | — | — | 5 | — | — | 60 | — | — | — |
| Polybutadien Rubber (v) | | — | — | — | — | — | — | — | — | — | — | — | — | — | 5 | — |

Remarks:
(i) EOCN-1025 (Nippon Kayaku, an epoxy resin)
(ii) BRG-557 (Showa Union, Sortening Point 84°-89° C.)
(iii) 2-MZ (ShiKoKu Kasei in Japan, an imidazole curing agent represents 2-methylimidazole)
(iv) CTBN 1300 X13 (Goodrich Co.)
(v) KF 857 (Shin-etsu Co., an amino-modified silicone)

Compositions in accordance with Example No. 1 to 13 are experimented for comparing the superiority with (i) Dupont Instrument 943 TMA (temp. range: 60°-120° C., temp. elevating rate 5° C./Min)
(ii) Failure rate after 200 cycles at −80° C. for 5 min. and at 150° C. for 5 min. alternately.
(iii) Pressure cooker test failure rate among the 100 specimens (under 2 atm, at 120° C. 100% RH for 1,000 hrs.)

By the Composition Examples and the Comparative example shown in Table (I), (II), (III), it is apprehended that the insoluble and infusible globular particles according to the above-identified examples are prepared in a amount of 10-50% by weight based on the total weight and that highly reliable semiconductors which exhibit substantially lowered impact stress and reduced coefficient of linear thermal expansion may be produced therefrom.

What is claimed is:

1. A process for preparing a modified resin, wherein from about 10 to 50% by weight of said modified resin is in the form of insoluble and infusible globular particles, which comprises the steps of:
   (a) reacting an epoxy resin component in an amount of about 30 to 80 wt. % based on the total weight of the modified resin with a synthetic rubber compound component, in an amount of 10 to 30 wt. % based on the total weight of the modified resin, having one or more terminal functional groups selected from the group consisting of carboxy, hydroxy, and amino groups, wherein said synthetic rubber compound component is a rubber selected form the group consisting of butadiene rubber, isoprene rubber, acrylonitrile rubber, hydrogenated butadiene rubber and copolymers thereof, and
   (b) reacting the resultant product of said first reaction step (a) with a polysiloxane component having a reactive hydroxy group in an amount of about 10 to 60 wt. % based on the total weight of the modified resin to form said modified resin containing insoluble and infusible globular particles having a particle size of about 0.1 to 100 microns.

2. The process of claim 1, wherein said epoxy resin component comprises a member selected from the group consisting of bisphenol-A, phenolnovolac, cresolnovolac, and mixtures thereof, said epoxy resin component containing at least two epoxy groups within each molecule.

3. The process of claim 2, wherein said epoxy resin component is bisphenol-A.

4. The process of claim 2, wherein said epoxy resin component is phenolnovalac.

5. The process of claim 2, wherein said epoxy resin component is cresolnovalac.

6. The process of claim 1, wherein said polysiloxane component has a molecular weight of about 300 to 6,000, said polysiloxane containing at least a $C_1$-$C_3$ alkoxy group, a $C_1$-$C_6$ alkyl group and two hydroxy groups.

7. The process of claim 1, wherein said first reaction step (a) is conducted at temperature of about 100° to 200° C. for 1 to 10 hours and said second reaction step (b) is conducted at temperature of about 80° to 180° C. for 2 to 6 hours.

8. The process of claim 2, wherein said polysiloxane component has a molecular weight of about 300 to 6,000, said polysiloxane containing at least a $C_1$-$C_3$ alkoxy group, a $C_1$-$C_6$ alkyl group and two hydroxy groups.

9. The process of claim 6, wherein said first reaction step (a) is conducted at temperature of about 100° to 200° C. for 1 to 10 hours and said second reaction step (b) is conducted at temperature of about 80° to 180° C. for 2 to 6 hours.

10. The modified resin composition produced by the process of claim 1.

* * * * *